United States Patent
Maresh

(10) Patent No.: US 9,438,549 B2
(45) Date of Patent: Sep. 6, 2016

(54) CONTROLLING EXPIRATION OF ELECTRONIC MAIL SINGLE STORE ATTACHMENTS

(75) Inventor: Mark E. Maresh, Rochester Hills, MI (US)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 11/862,947

(22) Filed: Sep. 27, 2007

(65) Prior Publication Data

US 2009/0089378 A1   Apr. 2, 2009

(51) Int. Cl.
- G06F 15/16 (2006.01)
- H04L 12/58 (2006.01)
- G06Q 10/10 (2012.01)

(52) U.S. Cl.
CPC ............. *H04L 51/18* (2013.01); *G06Q 10/107* (2013.01); *H04L 51/08* (2013.01); *H04L 12/583* (2013.01); *H04L 51/063* (2013.01)

(58) Field of Classification Search
CPC ...................................... H04L 51/08
USPC ........................................ 709/206
See application file for complete search history.

(56) References Cited

U.S. PATENT DOCUMENTS

| | | | | |
|---|---|---|---|---|
| 5,864,852 | A * | 1/1999 | Luotonen | 726/14 |
| 6,189,024 | B1 | 2/2001 | Bauersfeld et al. | |
| 6,249,807 | B1 | 6/2001 | Shaw et al. | |
| 7,054,905 | B1 * | 5/2006 | Hanna et al. | 709/206 |
| 2002/0032742 | A1 * | 3/2002 | Anderson | 709/206 |
| 2002/0062323 | A1 * | 5/2002 | Takatori et al. | 707/514 |
| 2003/0182188 | A1 | 9/2003 | Duchow | |
| 2004/0117456 | A1 * | 6/2004 | Brooks | 709/217 |
| 2004/0254998 | A1 * | 12/2004 | Horvitz | 709/206 |
| 2005/0198170 | A1 | 9/2005 | LeMay et al. | |
| 2005/0198518 | A1 | 9/2005 | Kogan et al. | |

(Continued)

FOREIGN PATENT DOCUMENTS

| | | |
|---|---|---|
| DE | 10064627 A1 | 8/2001 |
| EP | 1286292 A2 | 2/2003 |

(Continued)

*Primary Examiner* — Liangche A Wang
*Assistant Examiner* — Sherman Lin
(74) *Attorney, Agent, or Firm* — Steven M. Greenberg, Esq.; CRGO Law

(57) ABSTRACT

Embodiments of the present invention provide a method, system and computer program product for controlling expiration of electronic mail (e-mail) single store attachments. A method to control expiration of e-mail single store attachments can include sending an e-mail message, the e-mail message including one or more attachments, creating a single store linked e-mail message by removing the one or more attachments from the sent e-mail message and replacing each of the one or more attachments with a corresponding single store attachment link. The method further can include storing the removed one or more attachments in an attachment server, where each of the one or more attachments has an expiration date, sending the single store linked e-mail message having the one or more store attachment links to one or more recipients and deleting an attachment stored on the attachment server based upon its respective expiration date having expired. When there is e-mail activity (e.g., forward, reply, etc.) associated with the single store linked e-mail, the expiration of the attachment associated with the attachment link can be modified.

7 Claims, 2 Drawing Sheets

(56) References Cited

U.S. PATENT DOCUMENTS

2005/0204133 A1 9/2005 LaLonde
2007/0180035 A1 8/2007 Liu et al.

FOREIGN PATENT DOCUMENTS

| GB | 2350711 A | 6/2000 |
| WO | 0122335 A2 | 3/2001 |

* cited by examiner

CONTROLLING EXPIRATION OF ELECTRONIC MAIL SINGLE STORE ATTACHMENTS

BACKGROUND OF THE INVENTION

1. Field of the Invention

The present invention relates to the field of computer networks that support the transmission of electronic mail (e-mail) and more particularly to the controlled expiration of e-mail single store attachments.

2. Description of the Related Art

In today's business world, e-mail is the most widely used business communication tool to exchange critical business information. The usage of corporate e-mail has been growing rapidly at a rate of 30% per year, or even faster according to recent industry statistics.

E-mail also has become a day-to-day tool for workgroup collaboration. E-mail messages and attachments are very often copied and forwarded many times within the workgroup only to make overall e-mail storage grow even faster. Furthermore, for regulatory and business continuity reasons, many corporations are clustering their mail servers and implementing e-mail content journaling to protect this critical information asset.

As a result, the overall volume of e-mail, measured in storage requirements, has increased as much as tenfold. This rapid increase of e-mail database size and traffic volume has caused many organizations to deal with e-mail overload issues such as additional physical storage requirements, mail server performance degradation, and extra administrative burdens e.g., longer backup time. When organizations maintain e-mail databases at an optimum size for mail server performance, organizations must reduce the number of users per server as the average e-mail storage space per user increases. Oftentimes additional mail servers, bandwidth and storage capacities are deployed or ad-hoc mail quotas are imposed to e-mail users to ease these concerns.

Industry experts attribute much of the e-mail overload to e-mail attachments. Several recent studies report that attachments account for more than 85% of all e-mail data. E-mail attachments consume a major portion of corporate e-mail resources, e.g., as much as 90%, to transmit, process and administer as e-mail storage.

One proposed method to reduce the proliferation of e-mail attachments is the use of a single instance storage repository for e-mail attachments. In general, an e-mail processor task module processes through mail files and replaces e-mail attachments with a link, e.g., an attachment link, based on a set of predefined rules, and stores a single copy of the attachment in a single instance storage repository. Thereafter, the intended one or more recipients will receive the e-mail message with an attachment link but not the attachment itself. Although initial e-mail storage savings are realized using the replacement attachment links, two significant problems remain.

First, the storage savings are temporary, in that when a message forward or reply is performed in the above-described process, the actual attachment is restored to the e-mail message and transmitted to the one or more intended recipients instead of the existing attachment link. When this forward or reply is subject to additional forward or reply, multiple copies of the attachment will flood the e-mail system potentially placing the e-mail system in even a worst mail storage space crisis. Second, the above-described process fails to address file management concerns of the newly created single instance message storage repository. More specifically, as more and more attachments are stored on the single instance message storage repository, file management rules are necessary to prevent additional mail storage space crises.

BRIEF SUMMARY OF THE INVENTION

Embodiments of the present invention address deficiencies of the art in respect to e-mail storage and provide a novel and non-obvious method, system and computer program product for controlling expiration of e-mail single store attachments in an e-mail management system. In one embodiment of the invention, a method to control the expiration of e-mail single store attachments can be provided. The method can include sending an e-mail message, the e-mail message including one or more attachments, creating a single store linked e-mail message by removing the one or more attachments from the sent e-mail message and replacing each of the one or more attachments with a corresponding single store attachment link.

The method further can include storing the removed one or more attachments in an attachment server accessible at the single store attachment link and in association with an expiration date, sending the single store linked e-mail message having the one or more store attachment links to the recipient at the designated email address, and deleting an attachment subsequent to passage of the expiration date. In one aspect of the embodiment, an attachment server can be notified to adjust the expiration date for the stored attachment.

In another embodiment of the invention, an e-mail management system configured for expiration control of e-mail single store attachments can be provided. The system can include a mail server coupled to one or more repositories of mail user databases and an attachment server coupled to a repository of single store attachments. The system also can include e-mail processor logic. The logic can include program code enabled to receive and copy a new e-mail message in the attachment server, to remove any attachments in the e-mail message and to store the removed attachments in the repository of single store attachments, to replace the removed attachments with a corresponding attachment link to the removed attachments in the repository of single store attachments in order to create a single store linked e-mail message, and to assign an expiration date to the removed attachments stored in the repository of single store attachments.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being

DETAILED DESCRIPTION OF THE INVENTION

Embodiments of the present invention provide a method, system and computer program product for the control of the expiration of e-mail single store attachments in an e-mail system. In accordance with an embodiment of the present invention, an e-mail message that includes an attachment can be received by one or more e-mail users in an e-mail system. E-mail attachment processor logic configured to perform single store attachment consolidation and build a single attachment store, e.g., a repository on an attachment server. The attachment processor logic processes each new incoming mail message, writes a complete message to the attachment server, strips or removes the attachments in the original e-mail message and replaces each with an "attachment link". The attachment link provides a recipient with access to the single copy of the attachment that is stored in the single attachment store. Notably, the attachment link contains a communication feature that can notify or "ping" the attachment server when the e-mail that contains that attachment link is transmitted, e.g., forward or reply, to new recipients.

Figure 1:
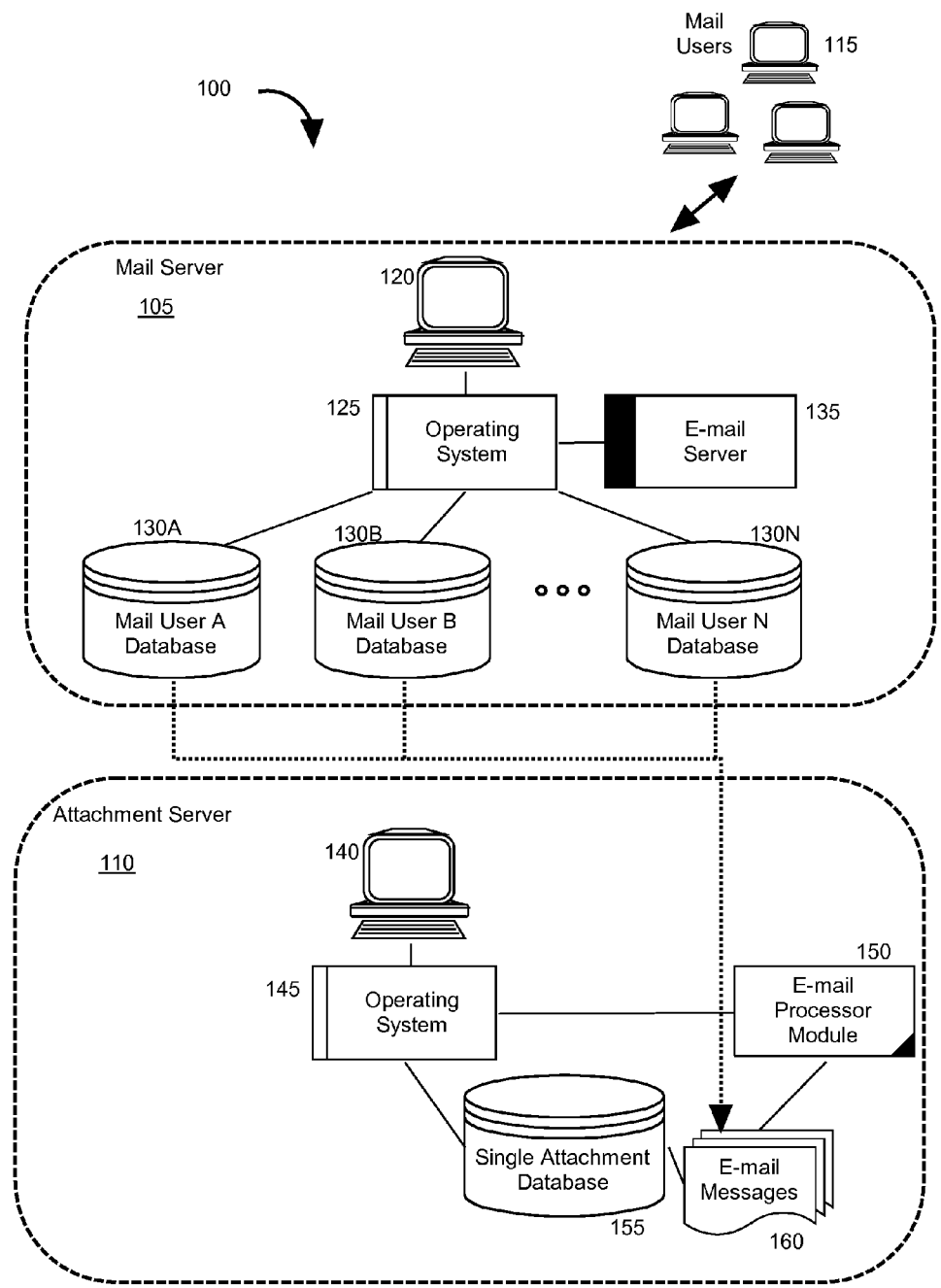
FIG. 1 is a schematic illustration of an e-mail system configured to control the expiration of e-mail single store attachments.

In illustration, FIG. 1 schematically depicts an e-mail system 100 configured to control the expiration of e-mail single store attachments. The system 100 can include mail server 105, attachment server 110 and mail users 115, each communicatively linked to the other over a network, bus or other connective input/output fabric.

The mail server 105 can include a host-computing platform 120 including an operating system 125. The operating system 125 can support the operation of an e-mail server application 135 configured to store and access mail user databases 130A, 130B through 130N. The mail user databases 130A, 130B through 130N are linked to mail users 115 and a single store attachment database 155 on the attachment server 110.

The attachment server 110 can include a host-computing platform 140 including an operating system 145. The operating system 145 can support the operation of e-mail processor logic 150 configured to process e-mail (incoming, outgoing and stored) and access mail user databases 130A, 130B through 130N. E-mail processor logic 150 can include program code enabled to receive a new e-mail message, to write a complete copy of the e-mail message to the attachment server 110, to remove any attachments in the original e-mail message and store the attachments in a single store attachment database, to replace the removed attachments with a corresponding attachment link to create a new single store linked e-mail message, and to assign an expiration date to each of the removed attachments stored in the single store attachment database.

The e-mail processor logic 150 runs in the background on a regular basis against the mail user databases 130A, 130B through 130N. In one embodiment, for each new message received by e-mail system 100, the e-mail processor logic 150 can write a complete message to the attachment server 110 and remove any attachments in the original e-mail message. The e-mail processor logic 150 also can replace the removed attachments in the original e-mail message with a corresponding attachment link to create a "single store linked e-mail message". In other words, the single store linked e-mail message includes the original e-mail message text and the attachment link. Consequently, the sizes of individual mail user databases 130A, 130B through 130N, are substantially reduced as the attachments no longer reside upon them.

In addition, the e-mail processor logic 150 can assign an expiration date to each removed attachment and store the removed attachment with expiration date in the single attachment store database 155. The expiration date can be a default expiration date that is automatically set by the e-mail server upon transmission of the e-mail message. Alternatively, the expiration date can be selectable by the sender. For example, the default expiration date could be set at 3 months; however, a user could change the default to 6 months if the user felt the data would be useful for that period of time.

Notably, the attachment link is configured to include a communication feature or mechanism that notifies or pings the attachment server 110 to adjust the expiration date on a stored attachment that corresponds to the attachment link that has been forwarded (or replied to) in an e-mail message. In other words, when creating the attachment links to replace the attachments to the original e-mail, each attachment link has a communication mechanism to notify the attachment server that the corresponding attachment is active and its current expiration date should be modified such that the attachment is not deleted from the single attachment store 155. As long as the attachment server receives pings from the attachment link, the attachment corresponding to that attachment link is kept active. Otherwise, once the pings for the attachment link stop, the expiration date is no longer adjusted and the attachment is deleted from the attachment server 110 upon reaching its expiration date. For example, an attachment link corresponds or associates with an attachment that has an expiration period of 6 months. When this attachment link pings the attachment server after 2 months, the expiration period of the attachment can be increased by 6 more months or any other desired time period.

Figure 2:
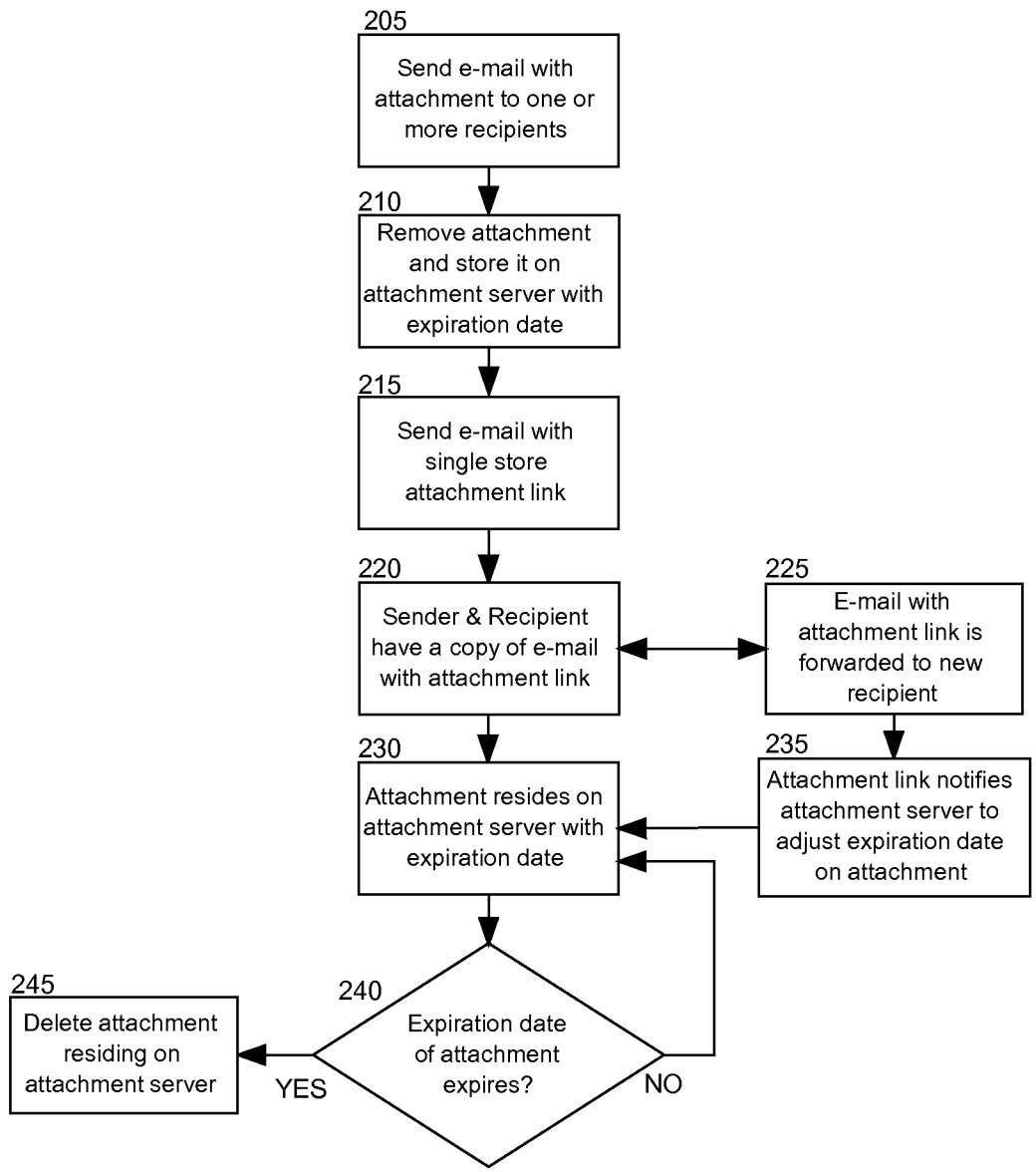
FIG. 2 is a flow chart illustrating a process to control the expiration of e-mail single store attachments in the e-mail system of FIG. 1.

In further illustration, FIG. 2 is a flow chart illustrating a process for the control of the expiration of e-mail single store attachments in the e-mail system of FIG. 1. Beginning in block 205, e-mail message 160 including one or more attachments is sent to one or more recipients. In block 210, an e-mail processor logic 150 is used to strip or remove the one or more attachments from the sent e-mail message and each attachment is given an expiration date, for storage in a single store attachment database. Additionally, the e-mail processor logic 150 can create a new e-mail message, e.g., a single store linked e-mail message, by replacing each removed attachment with an attachment link for transmission to the designated recipients. In block 215, the e-mail with the single store attachment link is sent to the designated recipients. At this time, in block 220, both the sender and any designated recipients will each have a copy of the e-mail message with the single store attachment link instead of the original attachments.

At block 225, the e-mail with the single store attachment link can be forwarded (replied) to a new recipient, which causes the attachment link to notify the attachment server 110 to adjust the expiration date on the corresponding attachment stored in the single store attachment database 155 in block 235. Thereafter, in decision block 240, it can be determined whether the expiration date of the attachment associated with the attachment link has expired.

In decision block 240, if it is determined that the expiration date of the attachment associated with the attachment link has expired, in block 245 the attachment can be deleted from the attachment server 110. Otherwise, in block 230, the attachment will continue to reside in the single attachment database 155 of attachment server 110.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method to control expiration of electronic mail (e-mail) single store attachments, the method comprising:
   receiving a composed e-mail message intended for delivery to a designated recipient at a designated e-mail address, the e-mail message including an attachment;
   creating a single store linked e-mail message by removing the attachment from the received e-mail message and replacing the attachment with a corresponding single store attachment link;
   storing the removed attachment in an attachment server accessible at the single store attachment link and in association with an expiration date, the single store attachment link that is included in the e-mail message comprising a communication mechanism programmed to notify the attachment server that the removed attachment is active and that a current expiration date for the removed attachment should be modified such that the removed attachment is not deleted from the single attachment store;
   sending the single store linked e-mail message to the recipient at the designated e-mail address;
   notifying the attachment server by way of the communication mechanism to adjust the expiration date for the attachment; and,
   deleting the attachment subsequent to passage of the expiration date.

2. The method of claim 1, further comprising automatically setting the expiration date upon transmission of the single store linked e-mail message.

3. The method of claim 1, further comprising selectably setting the expiration date according to sender preference.

4. An electronic mail (e-mail) management system configured for expiration control of e-mail single store attachments, the system comprising:
   a computer system comprising one or more computers each comprising memory and at least one processor;
   a mail server coupled to one or more repositories of mail user databases;
   an attachment server coupled to a repository of single store attachments; and,
   e-mail processor logic comprising program code enabled, when executing in the computer system, to receive and copy a new e-mail message in the attachment server, to remove any attachments in the e-mail message and to store the removed attachments in the repository of single store attachments, to replace the removed attachments with a corresponding attachment link to the removed attachments in the repository of single store attachments in order to create a single store linked e-mail message, to assign an expiration date to the removed attachments stored in the repository of single store attachments, each attachment link that is included in an e-mail message comprising a communication mechanism programmed to notify the attachment server that a corresponding attachment is active and that a current expiration date for the for the corresponding attachment should be modified such that the corresponding attachment is not deleted from the single attachment store, and to subsequently notify the attachment server by way of the communication mechanism to adjust the expiration date for the attachment.

5. A computer program product comprising a computer usable storage medium comprising a memory device embodying computer usable program code for controlling expiration of electronic mail (e-mail) single store attachments, the computer program product comprising:
   computer usable program code for receiving a composed e-mail message intended for delivery to a designated recipient at a designated e-mail address, the e-mail message including an attachment;
   computer usable program code for creating a single store linked e-mail message by removing the attachment from the sent e-mail message and replacing the attachment with a corresponding single store attachment link;
   computer usable program code for storing the removed attachment in an attachment server accessible at the single store attachment link and in association with an expiration date, the single store attachment link that is included in the e-mail message comprising a communication mechanism programmed to notify the attachment server that the removed attachment is active and that a current expiration date for the removed attachment should be modified such that the removed attachment is not deleted from the single attachment store;

computer usable program code for sending the single store linked e-mail message to the recipient at the designated e-mail address;

computer usable program code for notifying the attachment server by way of the communication mechanism to adjust the expiration date for the attachment; and, computer usable program code for deleting the attachment stored on the attachment server subsequent to passage of the expiration date.

6. The computer program product of claim 5, further comprising automatically setting the expiration date upon transmission of the single store linked e-mail message.

7. The computer program product of claim 5, further comprising selectably setting the expiration date according to sender preference.

\* \* \* \* \*